United States Patent [19]

Ikebe et al.

[11] Patent Number: 5,385,235
[45] Date of Patent: Jan. 31, 1995

[54] CASING FOR HOUSING A CARTRIDGE

[75] Inventors: Masaru Ikebe, Saku; Haruo Shiba, Komoro; Yukio Miyazaki, Saku, all of Japan

[73] Assignee: TDK Corporation, Tokyo, Japan

[21] Appl. No.: 83,533

[22] Filed: Jun. 30, 1993

[30] Foreign Application Priority Data

Jul. 6, 1992 [JP] Japan .................. 4-052731[U]

[51] Int. Cl.⁶ ............................................ B65D 85/30
[52] U.S. Cl. ................... 206/308.1; 206/1.5; 206/493; 206/308.3; 206/307
[58] Field of Search ............... 206/1.5, 309, 444, 493, 206/387; 312/9.47, 9.48, 9.63

[56] References Cited

U.S. PATENT DOCUMENTS

| | | | |
|---|---|---|---|
| 3,677,396 | 7/1972 | Staar | 206/1.5 |
| 3,933,240 | 1/1976 | Humble | 206/1.5 |
| 4,287,989 | 9/1981 | Plummer . | |
| 4,383,610 | 5/1983 | Boshears . | |
| 4,406,369 | 9/1983 | Wallace et al. . | |
| 4,702,533 | 10/1987 | Seifert | 206/387 |
| 4,793,477 | 12/1988 | Manning et al. . | |
| 4,819,797 | 4/1989 | Holmgren | 206/387 |
| 4,838,422 | 6/1989 | Gregerson | 206/444 |
| 4,844,284 | 7/1989 | Drozd et al. | 206/1.5 |
| 5,039,982 | 8/1991 | Brühwiler | 206/1.5 |
| 5,042,659 | 8/1991 | Morita . | |
| 5,096,064 | 3/1992 | Rufo, Sr. et al. | 206/444 |
| 5,135,111 | 8/1992 | Stöger | 206/387 |

FOREIGN PATENT DOCUMENTS 3-3513   1/1991   Japan .
9004549  5/1990   WIPO .

*Primary Examiner*—David T. Fidei
*Attorney, Agent, or Firm*—Oblon, Spivak, McClelland, Maier, & Neustadt

[57] ABSTRACT

A casing for housing a cartridge includes an upper half and a lower half which are formed in two parts and are assembled so as to be adapted to house a cartridge in the casing; an opening for allowing the cartridge to be inserted into the casing and to be withdrawn from it, which is arranged in one of the sides of the casing; and a holding portion which is elastically engageable with a recessed portion in the cartridge wherein the holding portion is connected to at least of one of the first half and second half.

8 Claims, 8 Drawing Sheets

CASING FOR HOUSING A CARTRIDGE

FIELD OF THE INVENTION

Background of the Invention

The present invention relates to a casing for housing a cartridge, which is used to house, transport and keep a cartridge or the like which includes a disk-like medium, such as an optical disk, a magneto-optic disk, and a floppy disk and a tape-like medium, such as a digital compact cartridge (DCC).

Discussion of the Background

In general, the cartridge is dealt with in such a manner that it is housed in a casing in transportation, storage and sales. One known arrangement of such a casing is that the casing is constituted by an upper and lower covering halves formed in two parts, a cartridge can be inserted and withdrawn through an opening formed in one side, and the casing has spring members arranged therein as engagement means for elastically engaging with stepped portions in the cartridge in order to prevent the cartridge from dropping out of the casing.

The conventional casing has such a structure that the spring members which are arranged as the elastic engagement means in the lower half P are mounted, as separate parts, to the lower half P and assembled into it. This structure creates problems in that the number of parts is great, and that it is unreliable because a locking force or the like is subject to variations and the cartridge can drop out of the casing. In addition, the conventional casing involves disadvantages in that assembly is not easy, and the manufacturing process is complex, which leads to a substantial cost and low productivity.

SUMMARY OF THE INVENTION

It is an object of the present invention to solve the problems and eliminate the disadvantages, and to provide a casing for housing a cartridge capable of increasing safety in dealing with a cartridge, having effective assembly, lowering cost in a significant manner, and improving productivity in a substantial manner.

The foregoing and other objects of the present invention have been attained by providing a casing for housing a cartridge, comprising an upper half and a lower half which are formed in two parts and are assembled so as to be adapted to house a cartridge in the casing; an opening for allowing the cartridge to be inserted into the casing and to be withdrawn from it, which is arranged in the sides of the casing; and a holding portion which is elastically engageable with a stepped portion in the cartridge to be housed; wherein the holding portion is formed on and in at least of one of the halves so as to be integral with the one half.

It is preferable that the holding portion is constituted by a projection which protrudes from an inner surface of a sidewall of the one half in a direction substantially orthogonal to the direction of insertion and withdrawal of the cartridge to exhibit a convex surface of a circular arc shape.

It is preferable that the holding portion is a projection which is formed by a convex surface having a curvature of R, and wherein the curvature satisfies the following equation:

$$R \geq d \times 3$$

where d is the distance by which the projection extends into the stepped or recessed portion of the cartridge.

It is preferable that the holding portion is formed in one of the halves so as to be integral with it, the one half extending outwardly farther than the other half with respect to the portion where the holding portion is engaged with the stepped portion of the cartridge.

It is preferable that the holding portion is formed on an arm which is formed so as to be integral with the one half and to be deformable in the one half.

It is preferable that the arm is connected to the one half at the side of the opening, and the holding portion is formed at the leading edge of the arm which extends so as to be substantially parallel with the direction of insertion and withdrawal of the cartridge.

It is preferable that the upper and lower halves have such a structure that both halves are engaged with each other by ridge and groove connection which is formed on three sides except for the side where the opening is formed, and the arm with the holding portion thereon is connected to one of the halves which forms an inner side of the sides in engagement by the ridge and groove connection.

The casing in accordance with the present invention is used in such a manner that insertion and withdrawal of a cartridge are made through the opening. When the cartridge is pushed into the casing, and the stepped portion of the cartridge gets in touch with the holding portion which is formed on one of the halves, the holding portion is elastically deformed so as to be in engagement with the stepped portion. The cartridge can be held in the casing in a locking manner, and can be safely kept in the casing. In addition, when the cartridge is withdrawn from the casing, the holding portion can be deformed so as to disengage with the stepped portion by holding an edge of the cartridge which is exposed at a cutout portion of the opening and pulling the cartridge out of the casing. The cartridge can be smoothly drawn out by sliding, making handling easy.

In accordance with the present invention, assembly of the casing with a reliable locking engagement means can be made remarkably effective, the number of parts is small, there are no variations in locking force, smooth insertion and withdrawal operation can be ensured, and safety in handling a cartridge can be increased. Assembly is good, the cost can be significantly lowered, and productivity can be substantially improved.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Now, the present invention will be described in detail with reference to preferred embodiments illustrated in the accompanying drawings.

A first embodiment in accordance with the present invention will be explained in reference to FIGS. 1 through 6. The cartridge housing casing is constituted by an upper half 1 and a lower half 2 which are formed in two parts are assembled to be adapted to hold a cartridge a in the casing; an opening 3 for allowing the cartridge a to be inserted into the casing and to be withdrawn from it, which is arranged in one of the sides of the casing; and a holding portion 4 which is elastically engageable with a stepped or recessed portion b in the cartridge a to be housed. In the casing, the holding portion 4 is formed on and in at least of one of the halves, e.g. the lower half 2, to be integral with the one half (see FIG. 1).

In the first embodiment, the holding portion 4 is constituted by a projection which protrudes from an inner surface of a sidewall of the one half in a direction orthogonal to the direction of insertion and withdrawal of the cartridge a to exhibit a convex surface $4_1$ in a circular arc shape. It is convenient in terms of a smooth engagement operation that where R is defined to be the curvature of the convex surface, and d is extent by which the projection $4_1$ extends into the stepped or recessed portion b of the cartridge a (see FIG. 2), the curvature satisfies the following equation:

$$R \geq d \times 3$$

Figure 3:
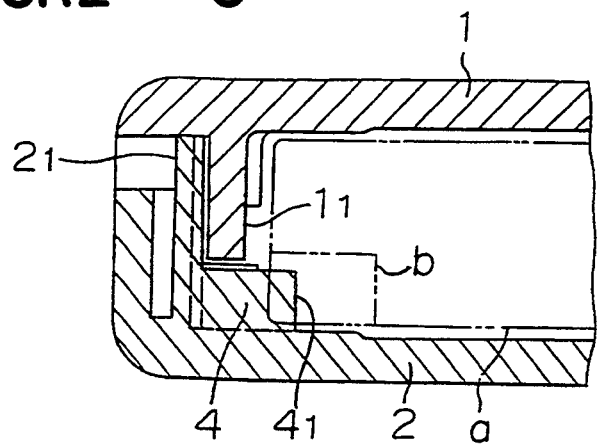
FIG. 3 is an enlarged vertical section taken substantially along line III—III of FIG. 2.
Figure 4:
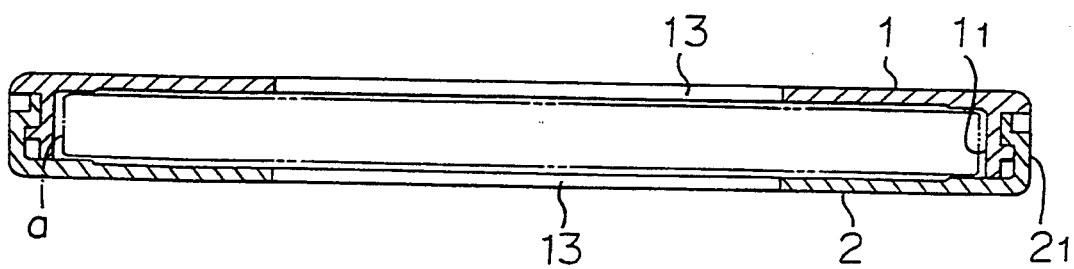
FIG. 4 is an enlarged vertical section taken substantially along line IV—IV of FIG. 1.
Figure 5:
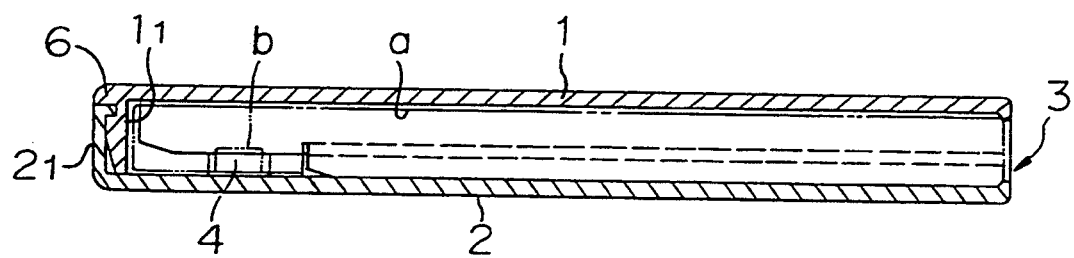
FIG. 5 is an enlarged vertical section taken substantially along line V—V of FIG. 1.
Figure 6:
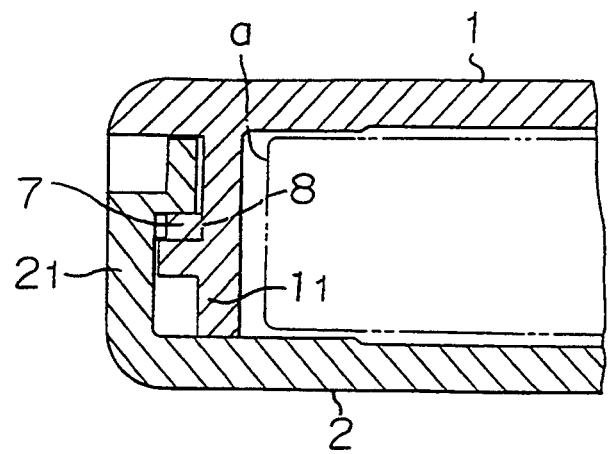
FIG. 6 is an enlarged vertical section taken substantially along line VI—VI of FIG. 1.

It is recommendable that the holding portion 4 is formed on and in one of the halves so as to be integral with it, the one half extending outwardly farther than the other half with respect to the portion where the holding portion 4 is engaged with the stepped or recessed portion b of the cartridge a (see FIG. 3).

In other words, although it is optional which one of engaged sidewall $1_1$ and $2_1$ of the upper and lower halves 1 and 2 should take an inner position, the holding portion 4 is formed on the half which has the side wall at an outer position, not on the side wall which is at an inner position in comparison with the other side wall in engagement. The upper and lower halves 1 and 2 are assembled together so that the opening 3 is defined in one side, and the side walls $1_1$ and $2_1$ at the other three sides are engaged together by ridge and groove connection 6. The halves have edges at the side of the opening 3 formed with cutout 13 so that one edge of the cartridge a can be exposed. This arrangement facilitates holding the cartridge (see FIGS. 4 and 5).

Figure 1:
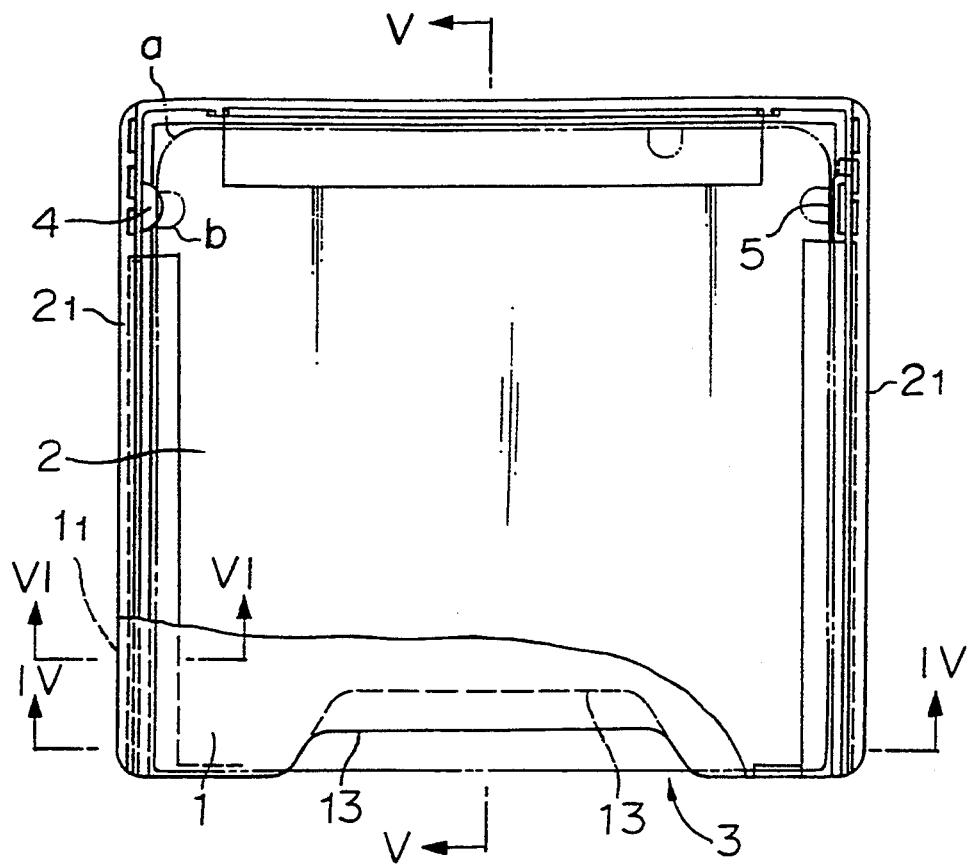
FIG. 1 is a plan view, partially cut away, of a first embodiment according to the present invention.
Figure 2:
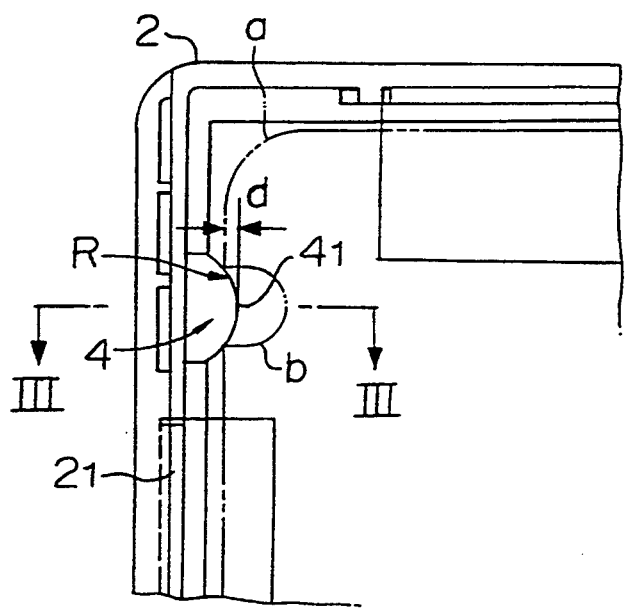
FIG. 2 is an enlarged plan view showing a portion of the embodiment shown in FIG. 1.

In the casing, a guide portion 5 is protrusively formed to present a sliding surface which is at the side opposite the holding portion 4 (see FIG. 1). The guide portion helps to bring the cartridge closer to the holding portion 4 and to maintain locking when the cartridge a has been inserted. In addition, it is effective that if necessary, the sidewall $1_1$ and $2_1$ and the upper and lower halves 1 and 2 have mating surfaces provided with such an engagement structure that both walls can slidably coupled at slide type ridge and groove portions 7 and 8 (see FIG. 6).

Figure 7:
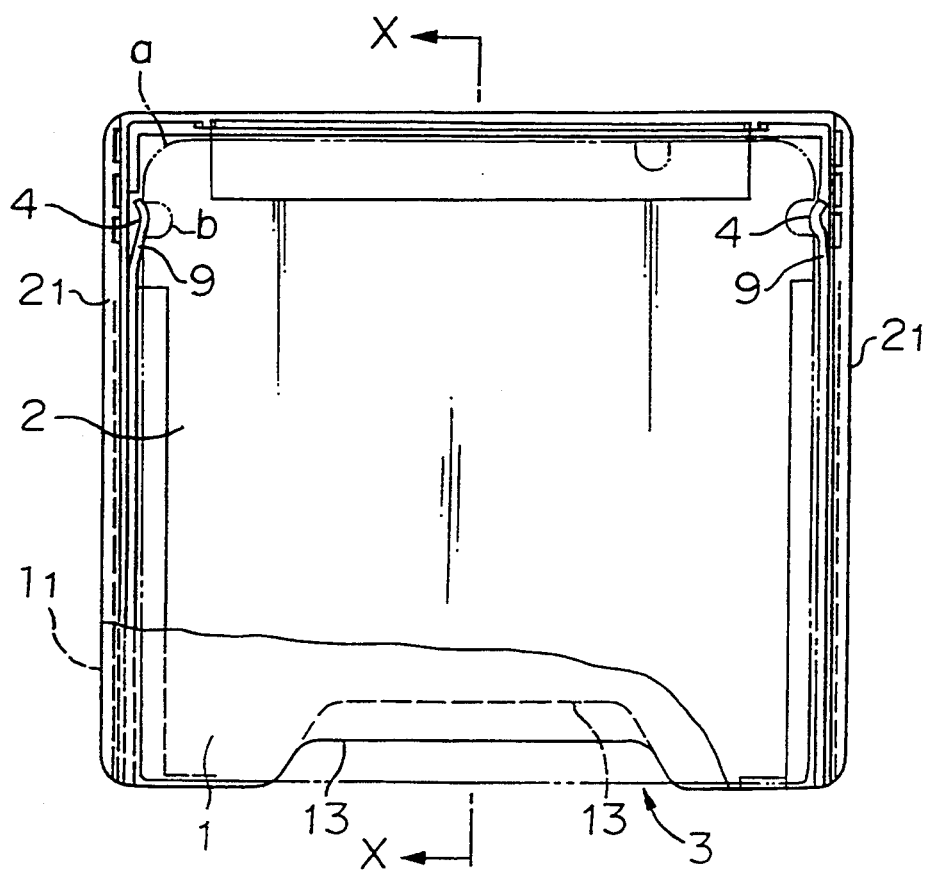
FIG. 7 is a plan view, partially cut away, of a second embodiment according to the present invention.
Figure 8:
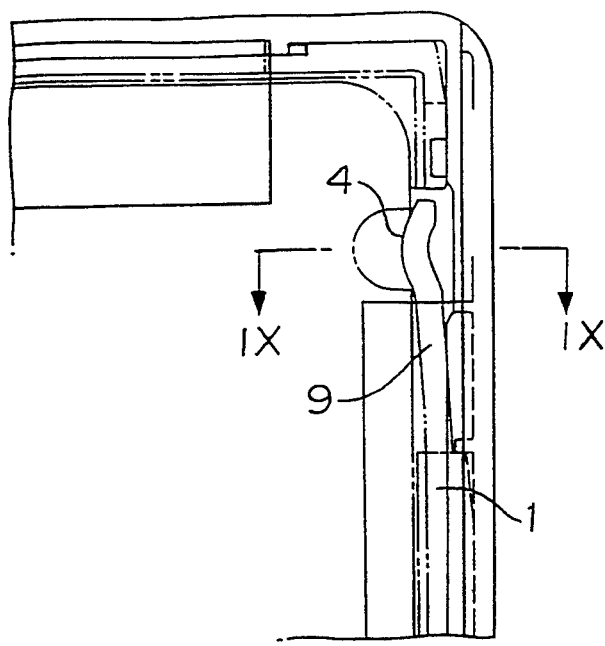
FIG. 8 is an enlarged plan view showing a portion of the second embodiment shown in FIG. 7.
Figure 9:
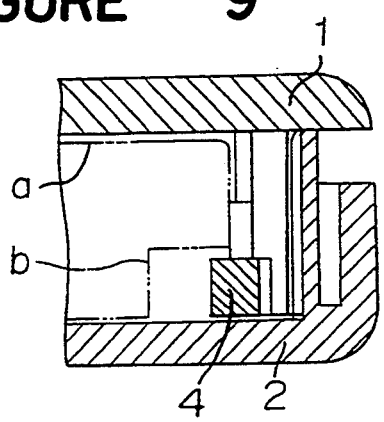
FIG. 9 is an enlarged vertical section taken substantially on line IX—IX of FIG. 8.
Figure 10:
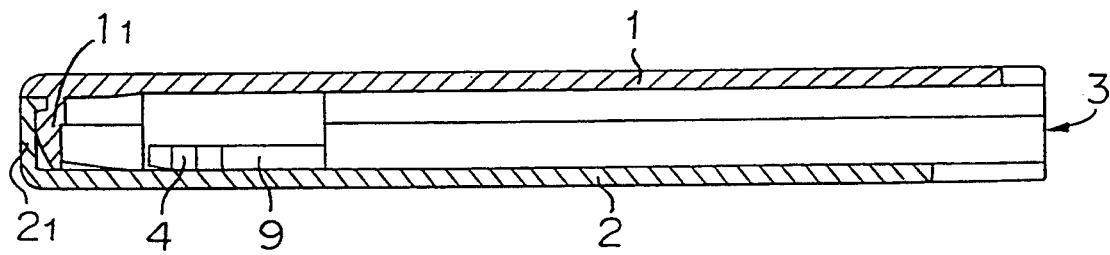
FIG. 10 is an enlarged vertical section taken substantially along line X—X of FIG. 7.
Figure 11:
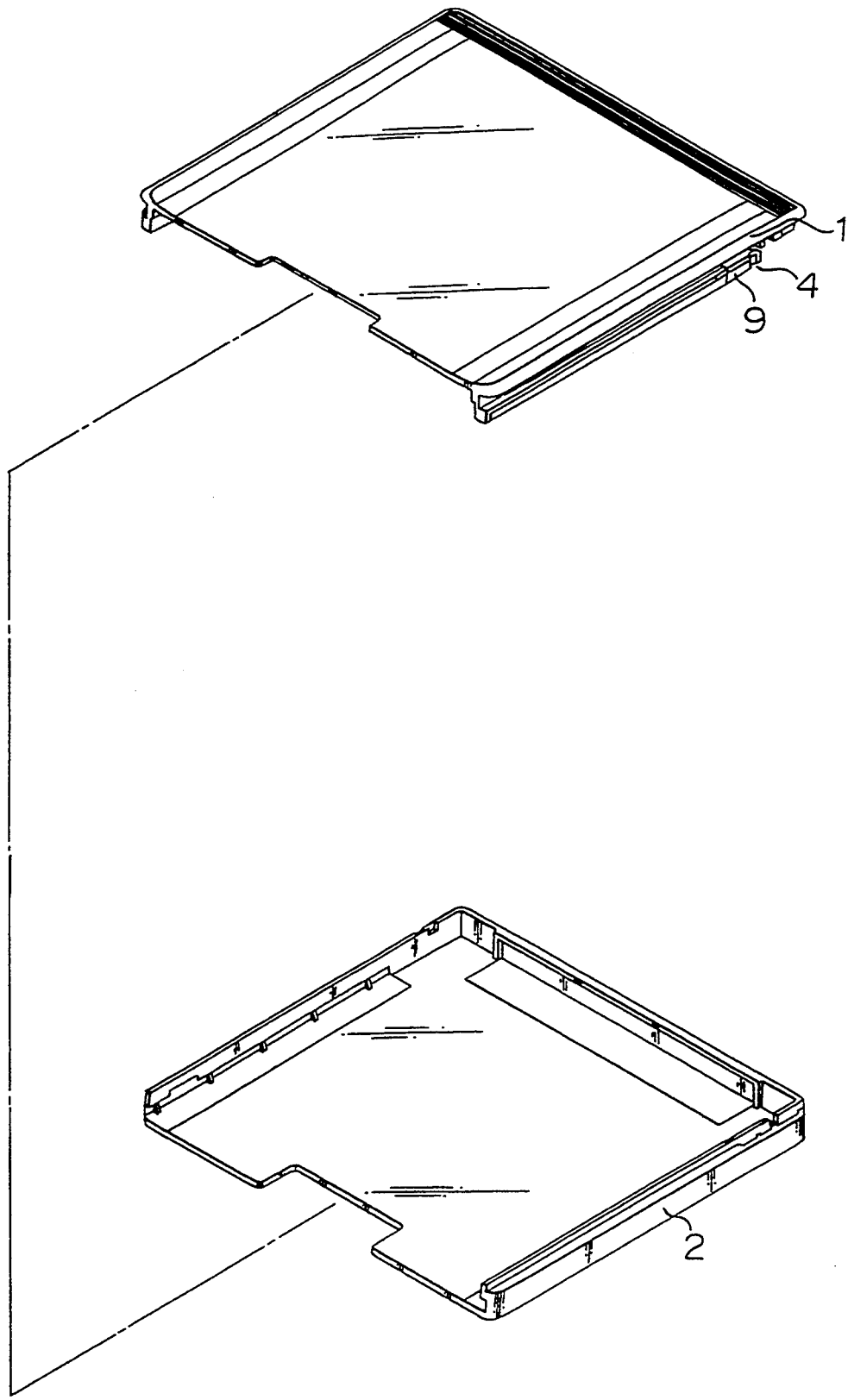
FIG. 11 is an exploded perspective view showing the second embodiment.

A second embodiment according to the present invention will be explained with reference to FIGS. 7 through 9. In the second embodiment, at least one of the upper and lower halves 1 and 2, e.g. the sidewall $1_1$ of the upper half, has a portion cut out at a position corresponding to the stepped or recessed portion b of the cartridge a which has been housed. The sidewall $1_1$ is the one that forms an inner side of the sides in engagement when both halves 1 and 2 are assembled together. Into the cut out portion, an arm 9 extends to be substantially parallel with the direction of insertion and withdrawal of the cartridge a. The arm 9 is connected to the side wall $1_1$ at the side of the opening 3 for insertion and withdrawal of the cartridge a to be integral with the sidewall $1_1$. It is preferable that the arm 9 projects from the side wall $1_1$ to slant toward the inside of the casing. The arm 9 has a leading edge provided with the holding portion 4 which is elastically engageable with the stepped portion b of the cartridge a. The holding portion 4 may be formed by curving the leading edge of the arm 9 so as to protrude toward the inside of the casing. When the cartridge a is inserted, the arm 9 is elastically deformed, causing the holding portion 4 on the leading edge to engage with the stepped portion b of the cartridge. The arm 9 has a spring function, and makes engagement of the holding portion 4 and the stepped portion b of the cartridge 45 firm. Another arm 9 with the holding portion can be arranged at an opposite side.

Figure 12:
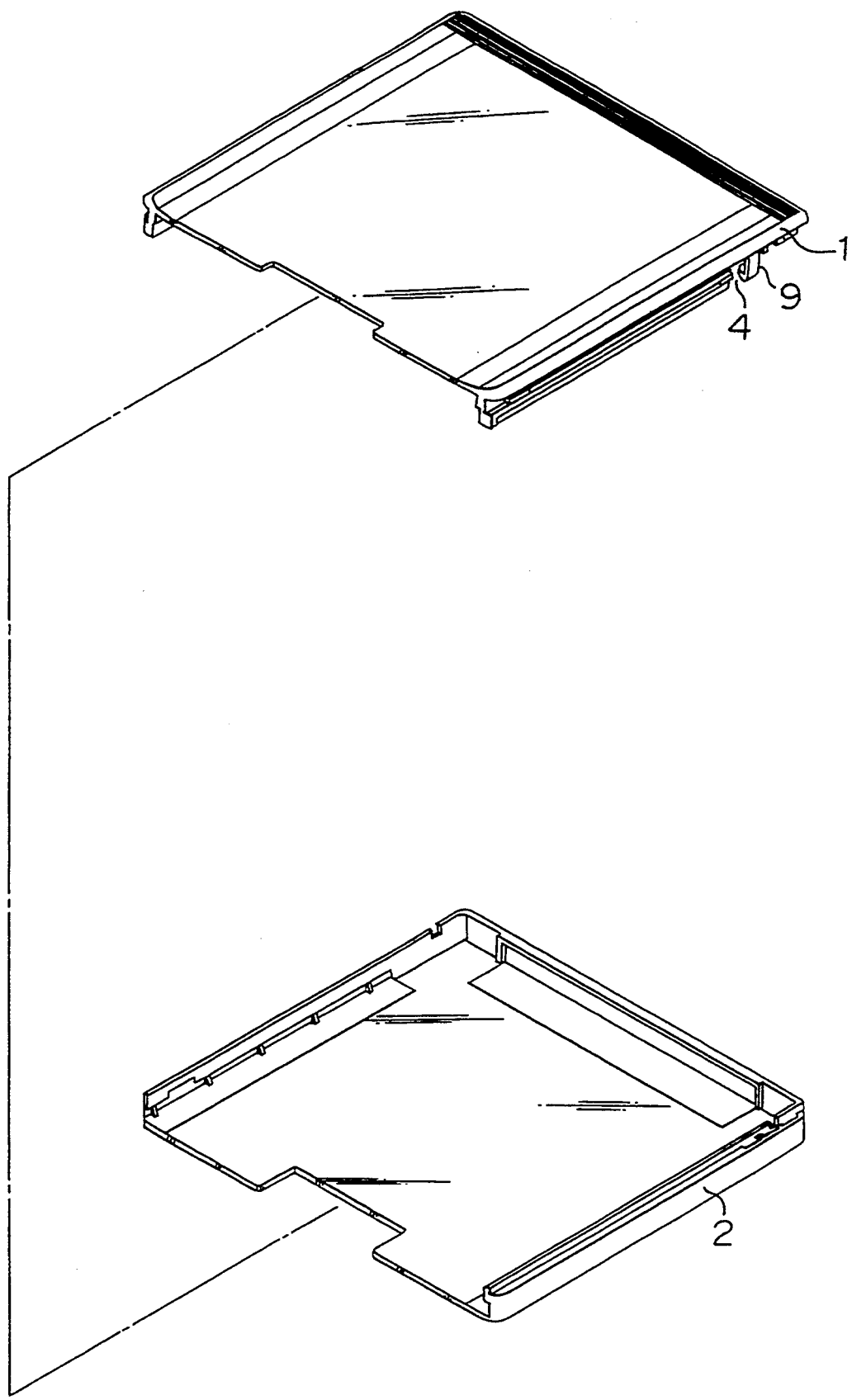
FIG. 12 is an exploded perspective view showing a third embodiment according to the present invention.
Figure 13:
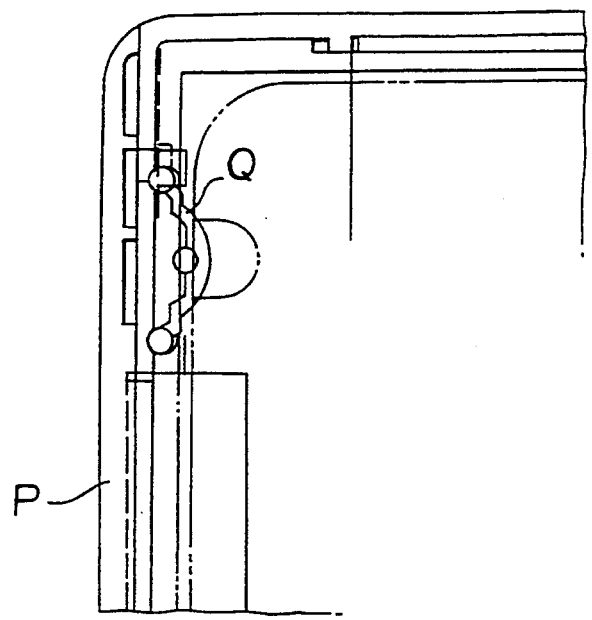
FIG. 13 is an enlarged plan view showing a portion of a conventional casing.
Figure 14:
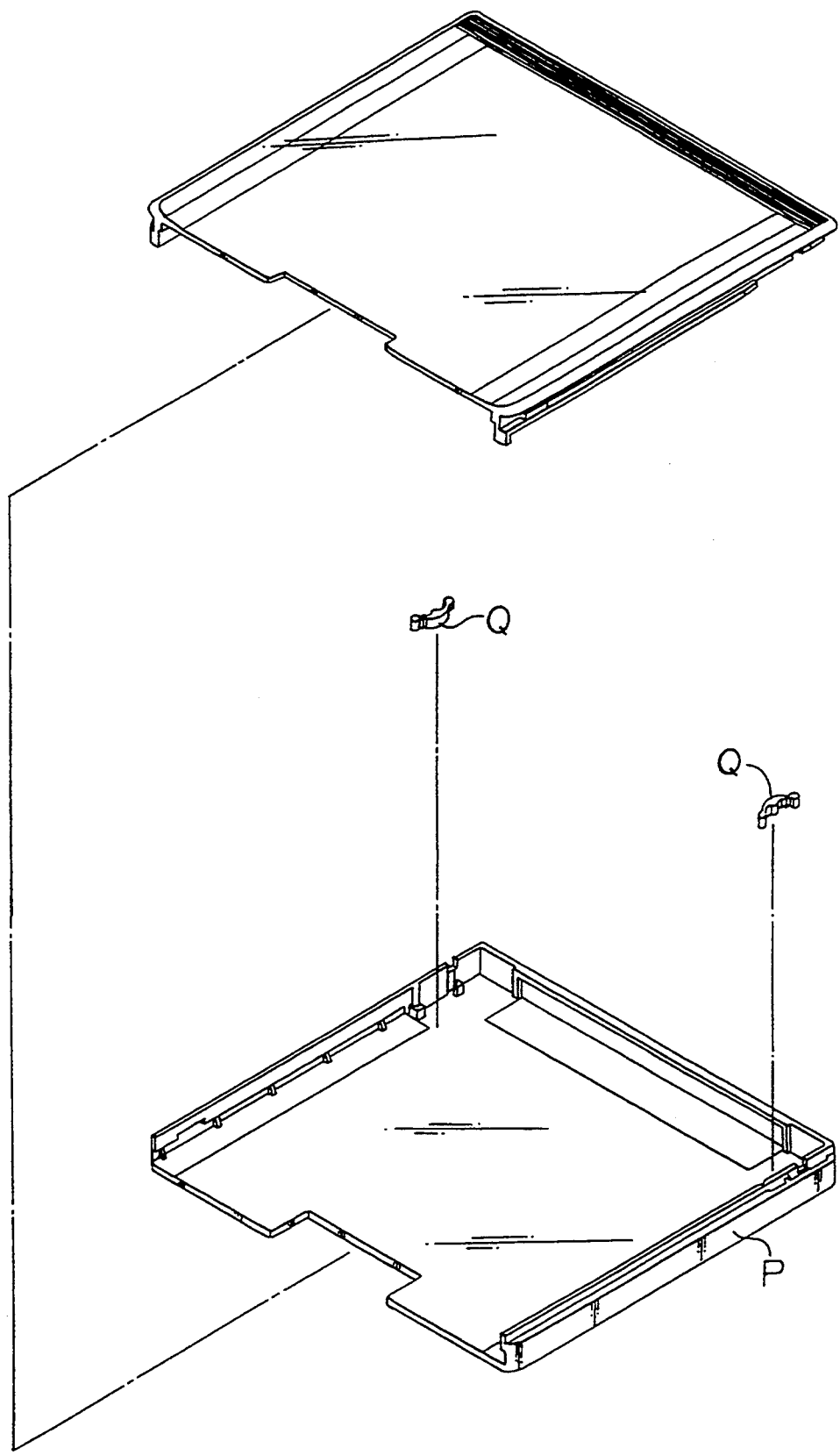
FIG. 14 is an exploded perspective view showing the conventional casing.

A third embodiment according to the present invention will be explained in reference to FIG. 12. In the third embodiment, the arm 9 extends into the cut out portion of the side wall $1_1$ to be substantially rectangular to the direction of insertion and withdrawal of the cartridge.

We claim:

1. A casing for housing a cartridge which has a recessed portion formed therein, which comprises:

an upper half and a lower half which are formed in two parts and are assembled together so as to be slidably coupled with respect to one another and to house a cartridge in the casing which is inserted in a first direction into the casing, the cartridge having a recessed portion and the casing having an opening on one side thereof for allowing the cartridge to be inserted into the casing in said first direction and to be withdrawn therefrom, and a holding portion mounted on one of said upper and lower half at an end of said casing opposite said opening wherein said holding portion is elastically engageable with said recessed portion in said cartridge, wherein said one of said upper half and lower half has a sidewall and the holding portion comprises a projection which protrudes from an inner surface of said sidewall in a direction substantially orthogonal to the direction of insertion and wherein the projection has an arc shape; and wherein the holding portion comprises a projection which is formed by a convex surface having a curvature R, and wherein the curvature satisfies the following equation:

$$R \geq d \times 3$$

where d is the distance by which the projection extends into the recessed portion.

2. A casing for housing a cartridge which has a recessed portion formed therein, which comprises:

an upper half and a lower half which are formed in two parts and are assembled together so as to be slidably coupled with respect to one another and to house a cartridge in the casing which is inserted in a first direction into the casing, the cartridge having a recessed portion and the casing having an opening on one side thereof for allowing the cartridge to be inserted into the casing in said first direction and to be withdrawn therefrom, and a holding portion mounted on one of said upper and lower half at an end of said casing opposite said opening wherein said holding portion is elastically engageable with said recessed portion in said cartridge wherein said one of said upper half and lower half has a sidewall and the holding portion comprises a projection which protrudes from an inner surface of said sidewall in a direction substantially orthogonal to the direction of insertion so as to engage the cartridge recessed portion and wherein the projection is located at an end of said side wall which is opposite that of said opening.

3. A casing according to claim 2, wherein the holding portion comprises a projection which is formed by a convex surface having a curvature R, and wherein the curvature satisfies the following equation:

$$R \geq d \times 3$$

where d is the distance by which the projection extends into the recessed portion.

4. A casing according to claim 1, wherein the holding portion is integral with one of said upper and lower half, said one half extending outwardly farther than the other half with respect to the portion where the holding portion extends into the recessed portion.

5. A casing according to claim 1, wherein the holding portion comprises an arm which is deformable upon engagement with said recessed portion.

6. A casing according to claim 5, wherein the arm is connected to said one half at a side portion thereof, the holding portion is formed at a leading edge portion of the arm and wherein the arm extends substantially parallel with said first direction of insertion of the cartridge.

7. A casing according to claim 5, wherein said upper and lower half are engaged with each other by a ridge and groove connection mechanism which is formed on three sides of said first and second half except for a side where said opening is formed, and wherein the arm with the holding portion thereon is connected to one of said first half and second half.

8. A casing according to claim 5, wherein the arm extends substantially orthogonally to said first direction of insertion of the cartridge.

* * * * *